United States Patent
Akers et al.

(10) Patent No.: US 8,336,836 B2
(45) Date of Patent: Dec. 25, 2012

(54) SYSTEMS AND METHODS FOR ATTACHING BARRIER SHEET MATERIAL TO EXTENSIBLE POLE ASSEMBLIES

(75) Inventors: Paul Akers, Bellingham, WA (US); Jon Lussier, Bellingham, WA (US)

(73) Assignee: Fastcap, LLC, Bellingham, WA (US)

( * ) Notice: Subject to any disclaimer, the term of this patent is extended or adjusted under 35 U.S.C. 154(b) by 0 days.

(21) Appl. No.: 13/455,022

(22) Filed: Apr. 24, 2012

(65) Prior Publication Data

US 2012/0234996 A1  Sep. 20, 2012

Related U.S. Application Data

(63) Continuation of application No. 12/902,562, filed on Oct. 12, 2010, now Pat. No. 8,162,274, which is a continuation of application No. 11/985,943, filed on Nov. 19, 2007, now Pat. No. 7,810,771.

(60) Provisional application No. 60/859,622, filed on Nov. 17, 2006.

(51) Int. Cl.
*E04G 25/00* (2006.01)

(52) U.S. Cl. ............. 248/200.1; 248/161; 248/188.9

(58) Field of Classification Search ............ 248/161, 248/200.1, 412, 206.5, 357, 351, 159, 121, 248/188.9, 188.8, 181.1, 181.2; 52/DIG. 12; 269/6; 254/114, 116, 93 G See application file for complete search history.

(56) References Cited

U.S. PATENT DOCUMENTS

| | | | | |
|---|---|---|---|---|
| 2,219,169 A | * | 10/1940 | Alter | 248/694 |
| 3,327,310 A | * | 6/1967 | Bethune et al. | 343/702 |
| 5,056,753 A | * | 10/1991 | Lunau et al. | 248/542 |
| 6,209,615 B1 | * | 4/2001 | Whittemore | 160/368.1 |
| 7,810,771 B1 | * | 10/2010 | Akers et al. | 248/200.1 |
| 8,162,274 B2 | * | 4/2012 | Akers et al. | 248/200.1 |
| 8,196,877 B2 | * | 6/2012 | Gridley et al. | 248/160 |
| 2004/0200585 A1 | * | 10/2004 | Whittemore | 160/368.1 |

* cited by examiner

*Primary Examiner* — Anita M King
(74) *Attorney, Agent, or Firm* — Michael R. Schacht; Schacht Law Office, Inc.

(57) ABSTRACT

A foot assembly is adapted to be detachably attached to a pole comprising a shaft portion and a ball portion. The foot assembly comprises a foot member defining a first body cavity and a clip member adapted to be detachably attached to the shaft portion of the pole assembly. With the clip member attached to the shaft portion of the pole assembly adjacent to the ball portion, the first body cavity of the foot member receives the ball portion, at least a portion of the shaft portion, and at least a portion of the clip member to detachably attach the foot member to the pole.

20 Claims, 6 Drawing Sheets

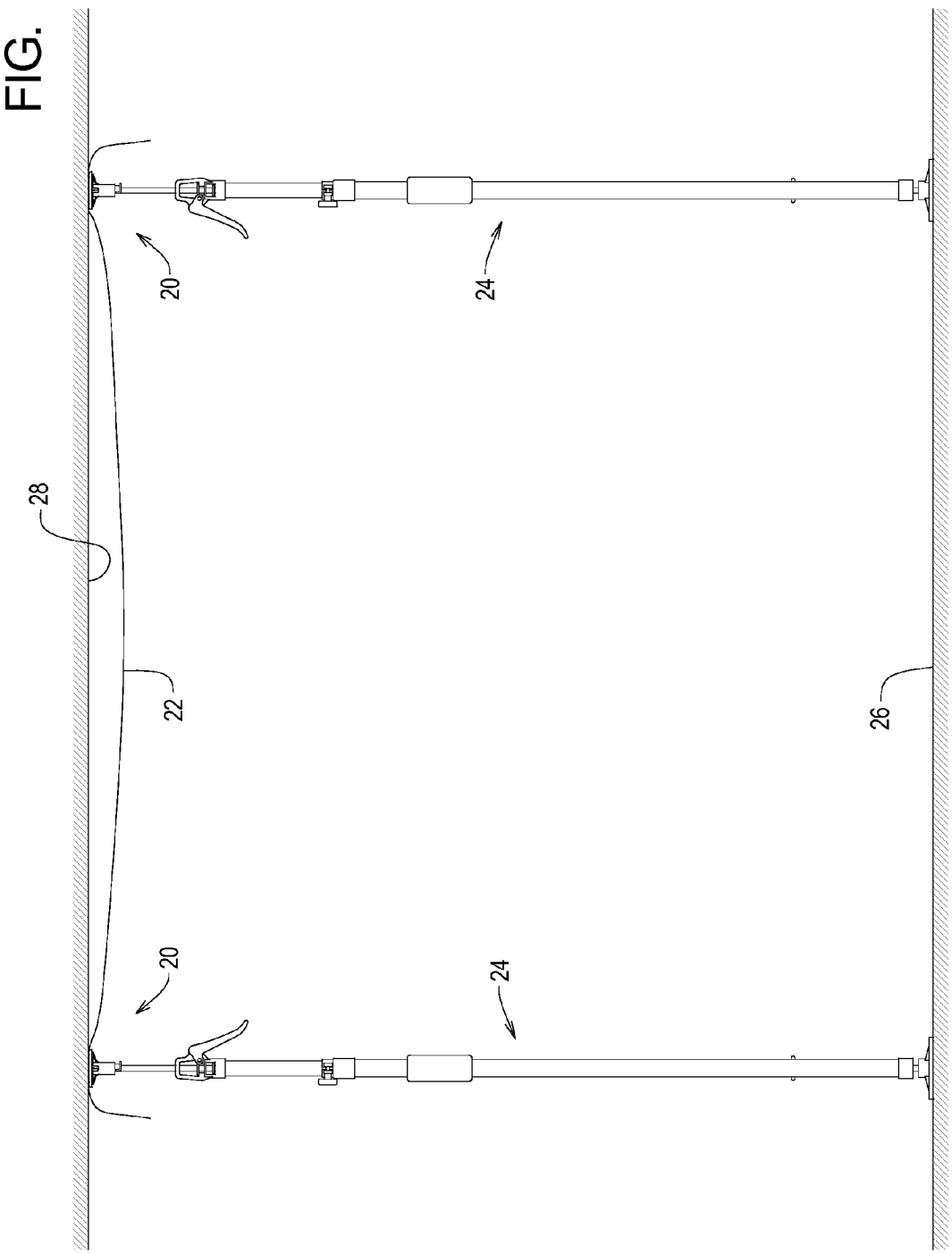

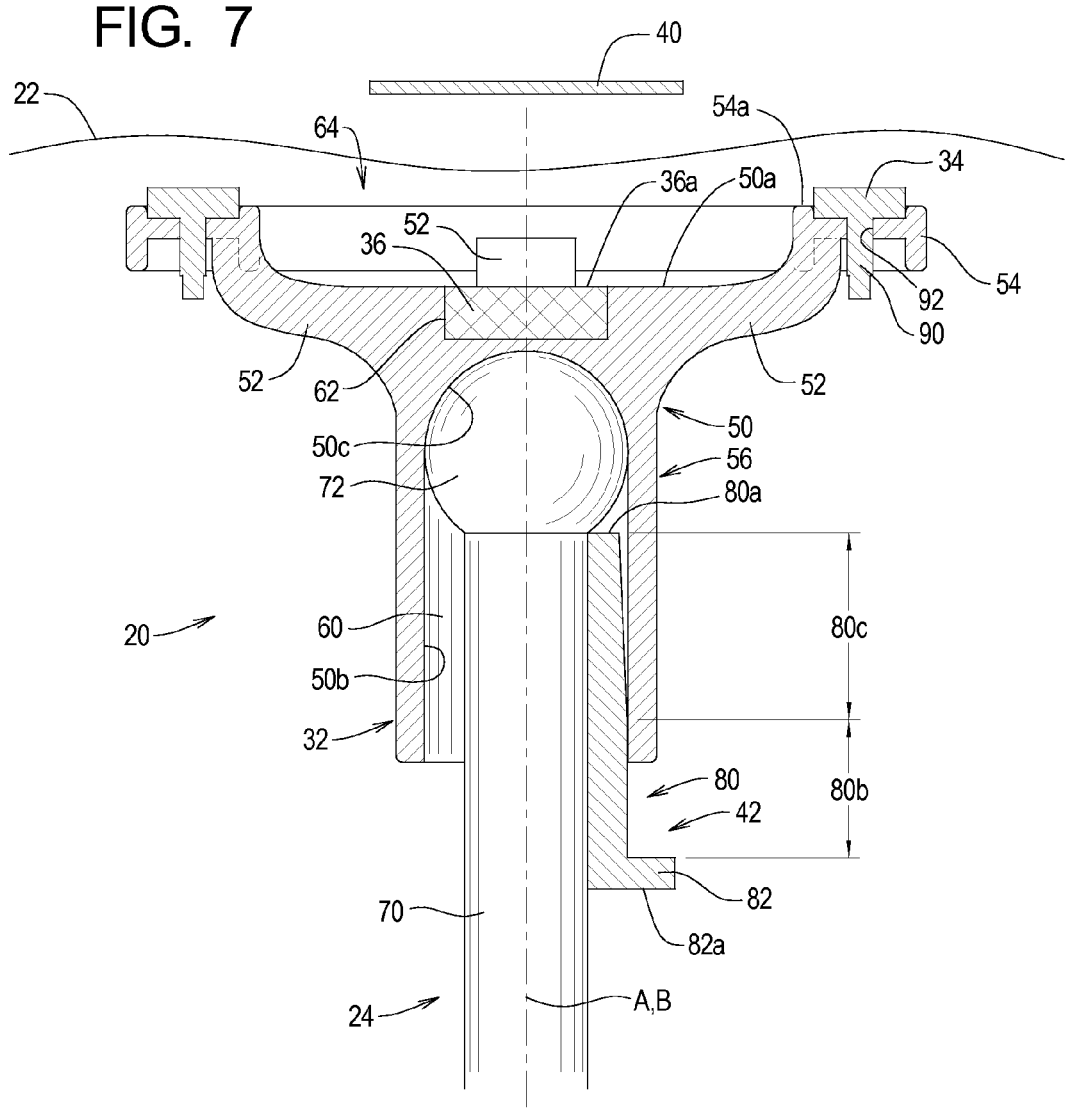

SYSTEMS AND METHODS FOR ATTACHING BARRIER SHEET MATERIAL TO EXTENSIBLE POLE ASSEMBLIES

RELATED APPLICATIONS

This application U.S. application Ser. No. 13/455,022 filed Apr. 24, 2012) is a continuation of U.S. application Ser. No. 12/902,562 filed Oct. 12, 2010, now U.S. Pat. No. 8,162,274, which issued on Apr. 24, 2012.

U.S. application Ser. No. 12/902,562 is a continuation of U.S. application Ser. No. 11/985,943 filed Nov. 19, 2007, now U.S. Pat. No. 7,810,771, which issued Oct. 12, 2010.

U.S. application Ser. No. 11/985,943 claims benefit of U.S. Provisional Application Ser. No. 60/859,622 filed Nov. 17, 2006.

The contents of all applications cited above are incorporated herein by reference.

TECHNICAL FIELD

The present invention relates to systems and methods of supporting sheet material to form a barrier and, in particular, to attachment systems and methods that facilitate the temporary connection of sheet material to an extensible pole assembly during erection of the barrier.

BACKGROUND

An extensible pole assembly typically comprises first and second extension members. One of the first and second extension members is slidably received by the other extension member. An extensible pole assembly may comprise more than two extension members, and one of the extension members is typically telescopically received within the other extension member.

An effective length of the extensible pole assembly is defined by the first and second extension members, and this effective length can be changed by sliding the extension members relative to each other. In use, the extensible pole assembly is typically in compression between two objects, and a locking system is used to lock the extension members together to fix the effective length of the extensible pole assembly between the two objects.

First and second foot assemblies are typically attached to the free ends of the first and second extension members, respectively. The foot assemblies define foot portions adapted to engage the shape and surface characteristics of object against which the foot assembly is forced.

Additionally, an advancing system may be arranged between one or both of the free ends of the extension members and the foot assembly associated therewith. If used, the advancing system allows the foot assembly to be displaced in short increments relative to the extension member associated therewith; the foot assembly is securely held in place after each advancement to ensure that the extensible pole assembly is kept in tension during operation of the advancing system.

Extensible pole assemblies are used during a variety of construction activities, such as maintaining a workpiece in place and/or displacing a workpiece. One use of an extension pole is to hold a portion of a barrier sheet in position relative to a structure to the structure into smaller areas. For example, the remodel of a structure may require the construction activities to overlap in time with normal use of the structure as a dwelling or work place. Construction activities can result in contamination of the air that can be a nuisance to people in the area of these activities. Accordingly, a barrier sheet may be installed within the structure to divide the structure into a construction area and a non-construction area. The barrier sheet will thus inhibit movement of contaminated air between the construction and non-construction areas.

To support the barrier sheet within a structure, one or more extensible pole assemblies are typically extended between the floor and the ceiling structure. The barrier sheet is held against the ceiling by the uppermost portions of the extensible pole assemblies.

The need thus exists for improved systems and methods for facilitating the use of general purpose extensible pole assemblies to support a barrier sheet.

SUMMARY

The present invention may be embodied as a foot assembly adapted to be detachably attached to a pole comprising a shaft portion and a ball portion comprising a foot member defining a first body cavity and a clip member adapted to be detachably attached to the shaft portion of the pole assembly. With the clip member attached to the shaft portion of the pole assembly adjacent to the ball portion, the first body cavity of the foot member receives the ball portion, at least a portion of the shaft portion, and at least a portion of the clip member to detachably attach the foot member to the pole.

The present invention may also be embodied as a barrier system comprising at least one pole defining a shaft portion and a ball portion, sheet material, a foot member defining a first body cavity, a clip member adapted to be detachably attached to the shaft portion of the pole assembly, and at least one attachment member. With the clip member attached to the shaft portion of the pole assembly adjacent to the ball portion, the first body cavity of the foot member receives the ball portion, at least a portion of the shaft portion, and at least a portion of the clip member to detachably attach the foot member to the pole. The at least one attachment member secures a portion of the sheet material to the foot member.

The present invention may also be embodied as a method of forming a pole assembly comprising the following steps. A pole comprising a shaft portion and a ball portion is provided. A foot member defining a first body cavity is provided. A clip member adapted to be detachably attached to the shaft portion of the pole assembly is provided. The clip member is attached to the shaft portion of the pole assembly adjacent to the ball portion. The ball portion is inserted into the first body cavity such that foot member engages at least a portion of the clip member to detachably attach the foot member to the pole.

BRIEF DESCRIPTION OF THE DRAWINGS

FIG. 1 is a side elevation view depicting an example barrier system in which an attachment system of the present invention may be used;

FIG. 7 is a section view similar to FIG. 5 illustrating disengagement of the example attachment system depicted in FIG. 1 from the sheet material.

DETAILED DESCRIPTION

Figure 5:
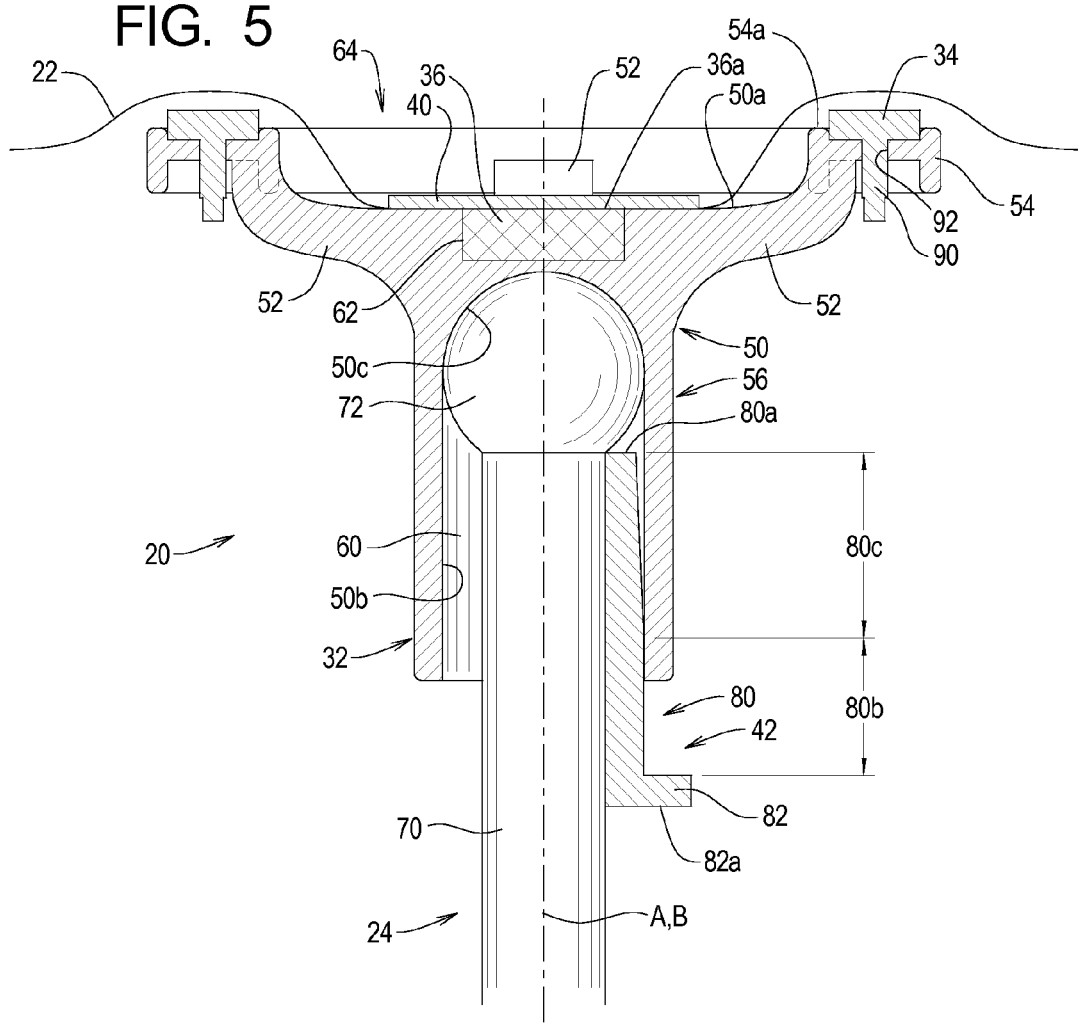
FIG. 5 is a section view taken along lines 5-5 in FIG. 3 illustrating engagement of the example attachment system depicted in FIG. 1 with an extensible pole assembly and sheet material.

Referring initially to FIGS. 5 and 7 of the drawing, depicted therein is an attachment system 20 for detachably attaching a sheet material 22 to an extensible pole member 24 forming part of an extensible pole assembly. FIG. 1 illustrates that a plurality of such attachment systems 20 may be used with a plurality of such extensible pole assembly members 24 to support the sheet material 22 relative to floor and ceiling surfaces 26 and 28. So supported, the sheet material 22 may be arranged to form a barrier system. The barrier system formed by the sheet material 22 is conventional and will not be described herein beyond what is necessary for a complete understanding of the construction and operation of the present invention.

Figure 4:
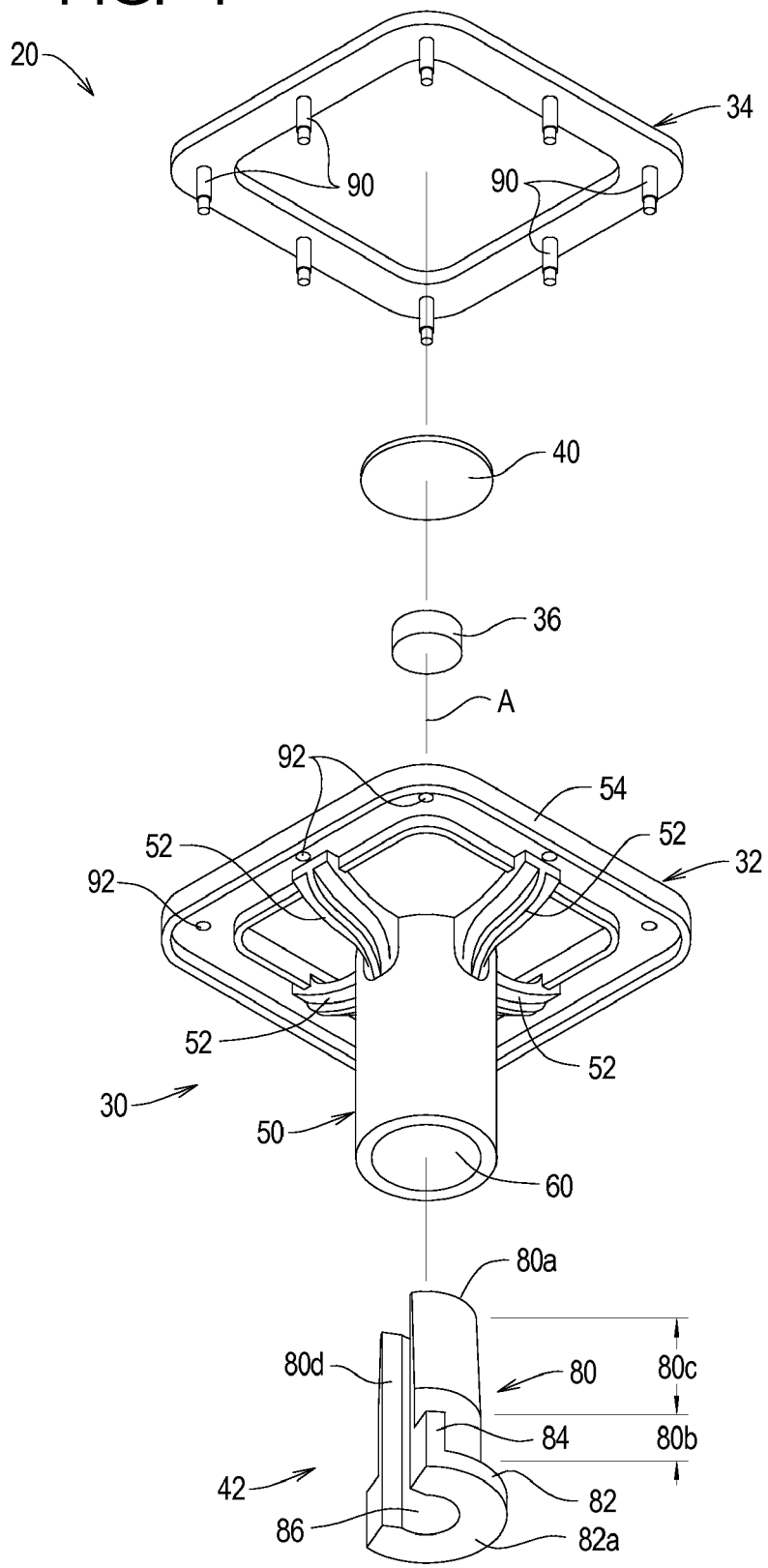
FIG. 4 is an exploded bottom perspective view of the example attachment system depicted in FIG. 1.

FIG. 4 illustrates that the example attachment system 20 comprises a foot assembly 30 comprising a foot member 32, an optional pad member 34, and a first attractable member 36. FIG. 4 further illustrates that the example attachment system 20 further comprises a second attractable member 40 and an optional clip member 42. The first and second attractable members 36 and 40 and/or the optional clip member 42 form a retaining system that detachably attaches a second portion of the sheet material 22 to the foot member 32 as will be described in further detail below.

FIGS. 4, 5, and 7 illustrate that the example foot member 32 comprises a body portion 50 from which extends at least one arm portion 52 that supports a flange portion 54. The body portion 50 defines a connecting portion 56 and a longitudinal axis A of the attachment system 20. The example foot member 32 comprises four of the arm portions 52.

The example body portion 50 defines a first body cavity 60 and a second body cavity 62. The flange portion 54 defines a flange opening 64. As will be described in further detail below, the example first body cavity 60 is adapted to allow the connecting portion 56 to engage an end of the extensible pole member 24. The second body cavity 62 is sized and dimensioned to receive the first attractable member 36. The flange opening 64 is sized and dimensioned to allow the second attractable member 40 to pass through the flange opening 64.

Figure 2A:
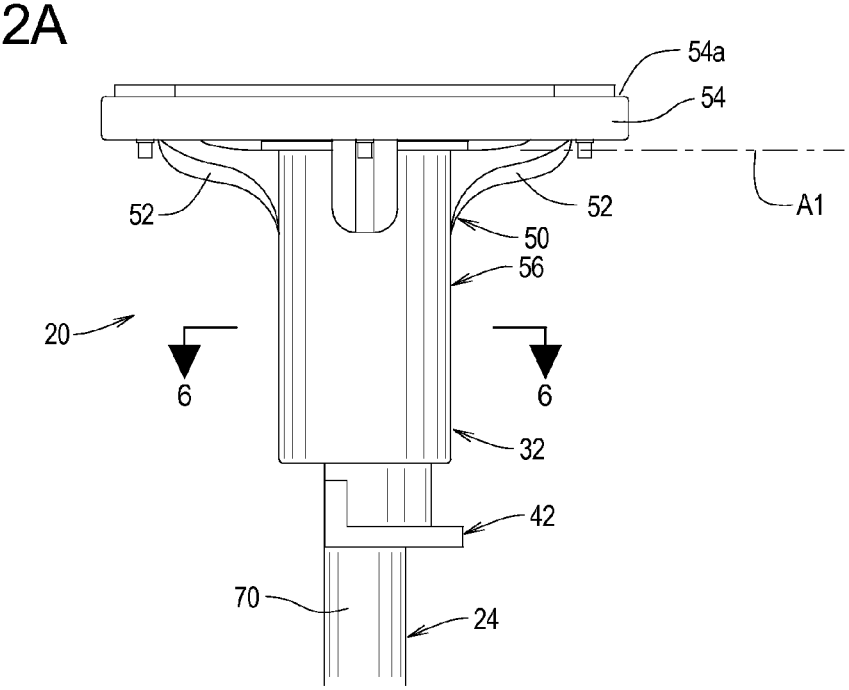
FIG. 2A is a side elevation view of an example attachment system of the present invention.

As perhaps best shown in FIGS. 2, 5, and 7, the arm portions 52 are configured to space the flange portion 54 from the body portion 50 such that an upper surface 50a of the body portion 50 is spaced from an upper surface 54a of the flange portion 54 along the longitudinal axis A. The second body cavity 62 is formed in the upper surface 50a of the body portion 50 along the longitudinal axis A. In the example foot member 32, the first attractable member 36 is snugly received within the second body cavity 62 with an exposed surface 36a of the member 36 flush with the upper surface 50a of the body portion 50.

Figure 2B:
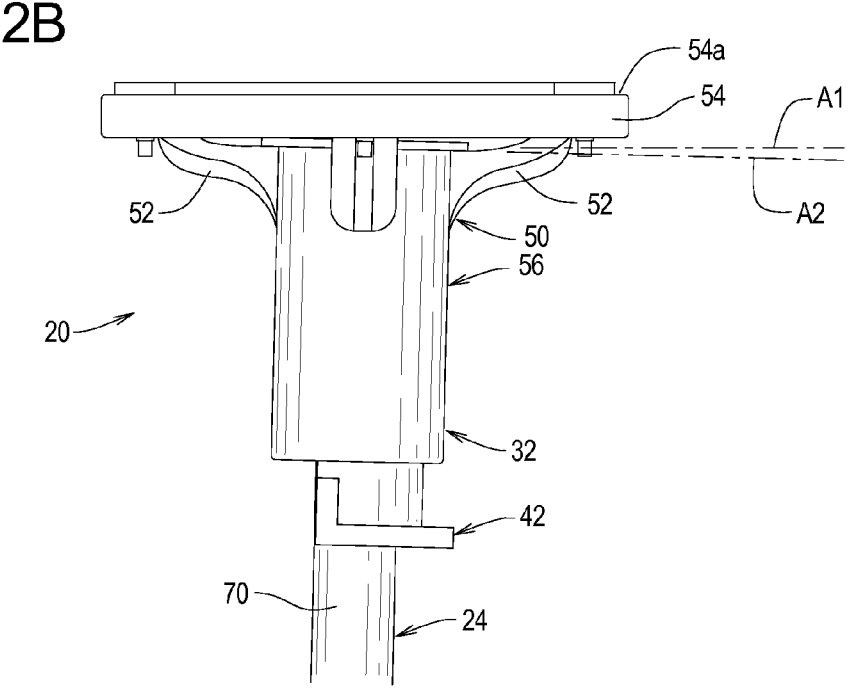
FIG. 2B is a side elevation view of the example attachment system similar to that of FIG. 2A illustrating deformation of arm portions such that an angle between an upper surface of a flange portion is at an angle of other than 90 degrees relative to a longitudinal axis of the attachment system.
Figure 3:
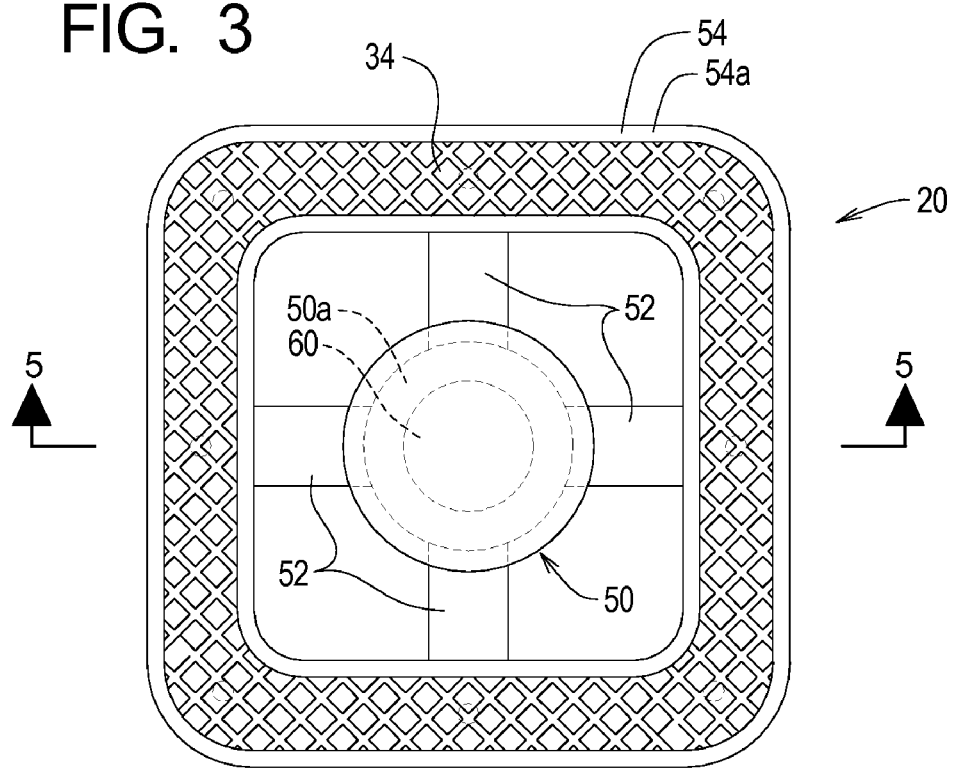
FIG. 3 is a top plan view of the example attachment system depicted in FIG. 1.

The example arm portions 52 are made of a resilient material. Accordingly, while the upper surface 50a of the body portion 50 is parallel to the upper surface 54a of the flange portion 54 when no asymmetrical forces are applied to the flange portion 54, the upper surface 54a of the flange portion 54 may be at an angle relative to the upper surface 50a of the body portion 50 when asymmetrical forces are applied to the flange portion 54. As shown in FIG. 2B, resilient arm portions 52 thus allow the foot member 32 to deflect or deform such that an angle between the upper surface 54a of the flange portion is at an angle of other than 90 degrees relative to the longitudinal axis A. FIG. 2B further illustrates that the upper surface 50a forms a reference surface A2 of the body portion 50, and an angle between the reference surface A2 and a reference plane A1 associated with the flange portion 54.

The exact configuration of the connecting portion 56 is not critical to any particular implementation of an attachment system of the present invention. The example first body cavity 60 formed in the connecting portion is defined by a generally cylindrical inner side wall surface 50b and rounded inner end wall surface 50c of the body portion 50. The first body cavity 60 is thus designed to receive an end of the extensible pole member 24 such that, at least while the pole member 24 is in compression, the foot assembly 30 stays in place during the process of assembling a barrier system.

The example extensible pole member 24 comprises a shaft portion 70 that terminates at its upper end in a ball portion 72. The diameter of the inner side wall surface 50b of the first body cavity 60 is approximately the same as a diameter of the ball portion 72, and the inner end wall surface 50c of the first body cavity 60 is defined by a radius of curvature that is approximately the same as that of the ball portion 72. The first body cavity 60 thus allows the ball portion 72 to come into contact with the end wall surface 50c thereof as shown in FIGS. 5 and 7.

In many situations, the engagement of the shaft portion 70 and ball portion 72 of the extensible pole member 24 with the first body cavity 60 foot member 32 will be sufficient to allow a barrier system to be formed using the foot assembly 30. However, to form a more rigid connection between the foot assembly 30 and the extensible pole member 24, the optional clip member 42 may be used.

As perhaps best shown in FIG. 4, the example clip member 42 comprises a clip portion 80, a radial flange portion 82, and a longitudinal flange portion 84. A channel 86 extends through the clip portion 80 from a flange surface 82a on the radial flange portion 82 to a tip surface 80a on the clip portion 80. The clip portion 80 defines a cylindrical surface portion 80b and a tapered surface portion 80c. Guide surfaces 80d and 80e are formed on the clip portion 80 on either side of the channel 86.

A distance between the guide surfaces 80c and 80d is slightly smaller than a diameter of the shaft portion 70 of the extensible pole member 24, and a diameter of the channel 86 is substantially the same as a diameter of the shaft portion 70. Additionally, an outer diameter of the cylindrical surface portion 80b of the clip portion 80 is substantially the same as the diameter of the inner side wall surface 50b, while a diameter of the tapered surface portion 80c decreases away from the cylindrical surface portion 80b.

In use, the guide surfaces 80d and 80e are brought into contact with the shaft portion 70 of the extensible pole member 24. The application of deliberate manual pressure on the clip portion 80 towards the extensible pole assembly causes the clip portion 80 to deform slightly such that the guide surfaces 80d and 80e separate sufficiently to allow the shaft portion 70 to enter the channel 86. At this point, the clip member 42 may be slid up such that first the tapered surface portion 80c and then the cylindrical surface portion 80b enters the first body cavity 60. At this point, the tip surface 80a on the clip member 42 engages the ball portion 72 of the extensible pole assembly as shown in FIGS. 5 and 7.

Figure 6:
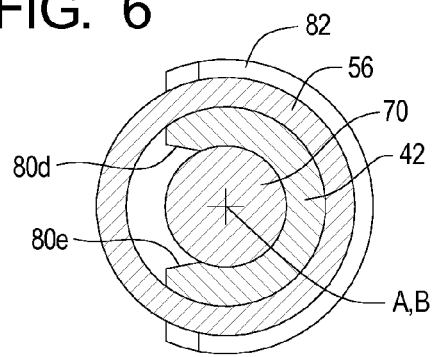
FIG. 6 is a section view taken along lines 6-6 in FIG. 2.

FIG. 6 shows that the clip member 42 snugly occupies the space that would otherwise exist between the inner side wall surface 50b and the surface of the shaft portion 70 of the extensible pole member 24. Friction between the clip member 42, pole shaft portion 70, and the inner side wall surface 50b thus inhibits movement of the foot member 32 relative to the extensible pole member 24. At this point, a longitudinal axis B of the extensible pole member 24 is substantially aligned with the longitudinal axis A of the foot member 32.

As depicted in FIGS. 2, 5, and 7, the pad member 34 may be attached to the upper surface 54a of the flange portion 54. The example pad member 34 is made of resiliently compressible material and may reduce the likelihood of damage to the ceiling surface 28 by the foot assembly 30. The pad member may be glued or otherwise connected to the flange upper surface 54a; the example pad member 34 is secured to the flange portion 54 by projections 90 that extend into corresponding holes 92 (FIG. 4) in the flange portion 54.

As shown in FIGS. 5 and 7, the sheet material 22 is detachably attached to the foot assembly 30 by arranging a portion of the sheet material 22 above the flange opening 64 and then bringing the second attractable member 40 into proximity with the first attractable member 36. The members 36 and 40 attract each other such that, when they are brought into proximity with each other, the attraction force clamps the sheet material 22 between the attractable members 36 and 40 (FIG. 5) to attach the sheet material 22 to the end of the extensible pole assembly 24. However, deliberate application of manual force may be used to pull the second attractable member 40 away from the first attractable member 36 as shown in FIG. 7 to detach sheet material 22 from the end of the extensible pole assembly 24.

In the example system 20, one of the first and second attractable members 36 and 40 is a magnet and the other of the first and second attractable members 40 is a piece of metal that is magnetically attracted to the magnet. By making the first attractable member 36 a magnet and the second attractable member 36 a metal disc, any small piece of metal (e.g., nut, washer, plug) may be used as the second attractable member 36 should the original metal disk become lost.

The spacing of the upper surface 50a of the body portion 50 from the upper surface 54a of the flange portion 54 described above creates a cavity between the body upper surface 50a when the foot assembly 30 engages the ceiling surface 28. This cavity accommodates the second attractable member 36 depicted in FIGS. 4, 5, and 7 and many other sizes and shapes of second attractable members without allowing the second attractable member to come into contact with the ceiling surface 28.

If the extensible pole assembly 24 is not perfectly vertical, the longitudinal axis B of the pole 24 may be at an angle relative to the ceiling surface 28. To accommodate this angle and still allow the flange upper surface 54a to be parallel to the ceiling surface 28, the arm portions 52 can deform slightly as generally described above.

The scope of the present invention should be determined by the claims appended hereto and not the foregoing detailed description.

What is claimed is:

1. A system for connecting sheet material to a pole that engages a structural surface, comprising:
  a foot member comprising
    a body portion,
    a flange portion adapted to engage the structural surface, and
    at least one arm portion extending between the body portion and the flange portion; whereby
  the body portion is detachably attached to the pole; and
  the flange portion applies pressure to the structural surface through a first portion of the sheet material to secure the first portion of the sheet material relative to the structural surface; and
  the at least one arm portion deforms when the flange portion applies pressure to the structural surface through the first portion of the sheet material.

2. A system as recited in claim 1, in which the foot member defines a plurality of arm portions, where at least one of the arm portions deforms when the flange portion applies pressure to the structural surface through the first portion of the sheet material.

3. A system as recited in claim 1, in which:
  the flange portion of the foot member defines a flange upper surface;
  the body portion of the foot member defines a reference surface; and
  deformation of the at least one arm portion allows an angle between the upper surface and the body reference surface to change when the flange portion applies pressure to the structural surface through the first portion of the sheet material.

4. A system as recited in claim 1, in which:
  the body portion and the flange portion are separated from each other by a space; and
  the at least one arm portion occupies a portion of the space separating the body portion and the flange portion.

5. A system as recited in claim 1, further comprising a retaining system mounted on the foot member to detachably attach a second portion of the sheet material to the foot member when the flange portion does not apply pressure on the structural surface through the first portion of the sheet material.

6. A system as recited in claim 5, in which the retaining system comprises a retaining member, where the retaining member clamps the second portion of the sheet material to the foot member.

7. A system as recited in claim 5, in which the retaining system comprises:
  a magnetic member; and
  a magnetically attractable member; whereby
    one of the magnetic member and the magnetically attractable member is secured to the foot member; and
    the at least a portion of the sheet material is arranged between the magnetic member and the magnetically attractable member to detachably attach the second portion of the sheet material to the foot member.

8. A system as recited in claim 7, in which:
  the flange portion of the foot member defines a flange upper surface;
  the body portion of the foot member defines a body upper surface;
  the one of the magnetic member and the magnetically attractable member secured to the foot member is secured to the body upper surface; and
  the body surface is offset from the flange upper surface such that the other of the magnetic member and the magnetically attractable member lies substantially between the flange upper surface and the body upper surface when the second portion of the sheet material is detachably attached to the foot member.

9. A system as recited in claim 5, in which the first portion of the sheet material at least partly surrounds the second portion of the sheet material.

10. A system as recited in claim 1, further comprising:
  a cavity is formed in body portion of the foot member;
  a ball is mounted on the pole; and
  a clip is secured to the pole; whereby
    the cavity receives the ball and the clip to detachably attach the body portion of the foot member to the pole.

11. A method of connecting sheet material to a pole that engages a surface, comprising:
- providing a foot member comprising a body portion, a flange portion, and at least one arm portion extending between the body portion and the flange portion;
- detachably attaching the body portion to the pole;
- arranging the pole such that the flange portion applies pressure to the structural surface through a first portion of the sheet material to secure the first portion of the sheet material relative to the structural surface; and
- causing the at least one arm portion to deform when the flange portion applies pressure to the structural surface through the first portion of the sheet material.

12. A method as recited in claim 11, in which the step of providing the foot member comprises the step of providing plurality of arm portions, where at least one of the arm portions deforms when the flange portion applies pressure to the structural surface through the first portion of the sheet material.

13. A method as recited in claim 11, in which:
- defining a flange upper surface on the flange portion of the foot member;
- defining a reference surface on the body portion of the foot member; and
- allowing an angle between the upper surface and the body reference surface to change when the flange portion applies pressure to the structural surface through the first portion of the sheet material.

14. A method as recited in claim 11, in which the step of providing the foot member comprises the steps of:
- separating the body portion and the flange portion with a space; and
- arranging the at least one arm portion such that the at least one arm portion occupies a portion of the space separating the body portion and the flange portion.

15. A method as recited in claim 11, further comprising the step of detachably attaching a second portion of the sheet material to the foot member when the flange portion does not apply pressure on the structural surface through the first portion of the sheet material.

16. A system for connecting sheet material to a pole that engages a surface, comprising:
- a foot member comprising
  - a body portion defining a body surface,
  - a flange portion defining a flange upper surface adapted to engage the structural surface, and
  - a plurality of arm portions extending between the body portion and the flange portion; whereby
- the body portion is detachably attached to the pole; and
- the flange portion applies pressure to the structural surface through a first portion of the sheet material to secure the first portion of the sheet material relative to the structural surface;
- the at least one arm portion deforms when the flange portion applies pressure to the structural surface through the first portion of the sheet material; and
- an angle between the upper surface and the body reference surface is capable of changing when the flange portion applies pressure to the structural surface through the first portion of the sheet material.

17. A system as recited in claim 16, in which:
- the body portion and the flange portion are separated from each other by a space; and
- each of the plurality of arm portions occupies a portion of the space separating the body portion and the flange portion such that gaps are defined between adjacent arm portions.

18. A system as recited in claim 16, further comprising a retaining system mounted on the foot member to detachably attach a second portion of the sheet material to the foot member when the flange portion does not apply pressure on the structural surface through the first portion of the sheet material.

19. A system as recited in claim 18, in which the retaining system comprises:
- a magnetic member; and
- a magnetically attractable member; whereby
- one of the magnetic member and the magnetically attractable member is secured to the foot member; and
- the at least a portion of the sheet material is arranged between the to magnetic member and the magnetically attractable member to detachably attach the second portion of the sheet material to the foot member.

20. A system as recited in claim 19, in which:
- the one of the magnetic member and the magnetically attractable member secured to the foot member is secured to the body upper surface; and
- the body surface is offset from the flange upper surface such that the other of the magnetic member and the magnetically attractable member lies substantially between the flange upper surface and the body upper surface when the second portion of the sheet material is detachably attached to the foot member.

* * * * *